Aug. 6, 1968          H. S. BEST ET AL          3,395,845
                       CHIP BONDING MACHINE
Filed Sept. 8, 1966                      11 Sheets-Sheet 1

FIG.1

INVENTORS
HOWARD S. BEST
ALFRED E. BORCHERT

BY Sughrue, Rothwell, Mion, Zinn & Macpeak
ATTORNEYS

FIG. 2

Aug. 6, 1968    H. S. BEST ET AL    3,395,845
CHIP BONDING MACHINE
Filed Sept. 8, 1966    11 Sheets-Sheet 4

Aug. 6, 1968  H. S. BEST ET AL  3,395,845
CHIP BONDING MACHINE

Filed Sept. 8, 1966  11 Sheets-Sheet 8

H. S. BEST ET AL 3,395,845

CHIP BONDING MACHINE

Filed Sept. 8, 1966

Aug. 6, 1968    H. S. BEST ET AL    3,395,845
CHIP BONDING MACHINE
Filed Sept. 8, 1966    11 Sheets-Sheet 10

FIG. 30

United States Patent Office 3,395,845
Patented Aug. 6, 1968

3,395,845
CHIP BONDING MACHINE
Howard S. Best, Raleigh, N.C., and Alfred E. Borchert, Jericho, N.Y., assignors to Corning Glass Works, Corning, N.Y., a corporation of New York
Filed Sept. 8, 1966, Ser. No. 577,944
15 Claims. (Cl. 228—1)

This invention relates to a bonding machine for bonding chips such as transistor chips to a substrate such as a ceramic substrate carrying a preformed circuit.

In the electronic arts many different types of electrical circuits are made utilizing electronic components, such as miniature transistor chips, positioned on substrates which carry preformed circuits of conductors and other components such as resistors and the like. The substrate circuit configuration and the transistors will vary considerably from circuit to circuit in type and relative position.

In the automation of placing of the transistor chips on the substrate, the substrate and chips must be very precisely positioned relative to each other because the chips must be deposited on the substrate within a very close tolerance due to their extremely small size. Not only must the chips and the substrate be precisely positioned relative to each other but the chips must be oriented relative to their own axis prior to being placed on the substrate. Further, the operation should be as fast as possible and as versatile as possible. That is, chips should be rapidly placed on the substrate with the chips being correctly oriented and precisely positioned. There should be a provision for choosing different types of transistor chips to be placed on the same substrate. An automatic machine should include a means for bonding the chips in their positions on the substrate.

The machine of this invention operates automatically to store a number of different types of transistor chips, select a predetermined one of the types of chips, orient the selected chip about its axis, align the chip, place it in a precise position on a substrate circuit which is movable relative to the positioner, and then bond the chip to the substrate. All of these are automatic operations being continuous, rapid and extremely accurate and including interlocking controls. The foregoing automatic operations are accomplished by a support for the substrate which is movable under numerical control in a horizontal plane underneath a rotatably indexable head carrying a plurality of hollow needles to which vacuum is applied for holding transistor chips on the ends of the needles. Adjacent the indexable needle carrying head there is a rotatably indexable magazine turret carrying a plurality of chip magazines each of which have a large number of transistor chips therein, and each magazine may have different types of chips. There is a control for interlocking the indexing of the needle head with the reciprocation of the needles and the indexing of the turret to allow selection of a chip from a selected magazine on the turret and placing the selected chip at a predetermined position on the substrate. A sonic bonding head is movably mounted to bond the positioned chip to the circuit on the substrate. The needles carrying the chip are rotatably and reciprocably mounted in the indexable turret so that they may move radially outwardly of the turret for depositing the chip on the substrate. A mechanical alignment fixture is positioned adjacent the needle indexing head prior to placing the chip on the substrate and this alignment fixture includes a missing chip detector for stopping the machine if a chip is missing from the tip of the needle.

Other features of the invention will be pointed out in the following description and claims and illustrated in the accompanying drawings, which disclose by way of example, the principle of the invention and the best mode which has been contemplated of applying that principle.

General arrangement

Referring to the drawings, the general arrangement of the machine includes a support table 40 for supporting a substrate S which may have a portion of electrical circuit including electrical conductors and resistors, etc. thereon in a precise position underneath an indexable needle head 42. The needle head is rotatably indexable and includes a plurality of needles 43 in corresponding needle assemblies 44.

Adjacent the needle head is an indexable magazine turret 46 for supporting and bringing into chip feeding position any one of three indexable rotary magazines 48a, 48b and 48c. Which of these magazines is stopped adjacent the nine o'clock position of the needle head is determined by preselection and actuation of one of a plurality of turret stops 50a, 50b and 50c.

Figure 1:
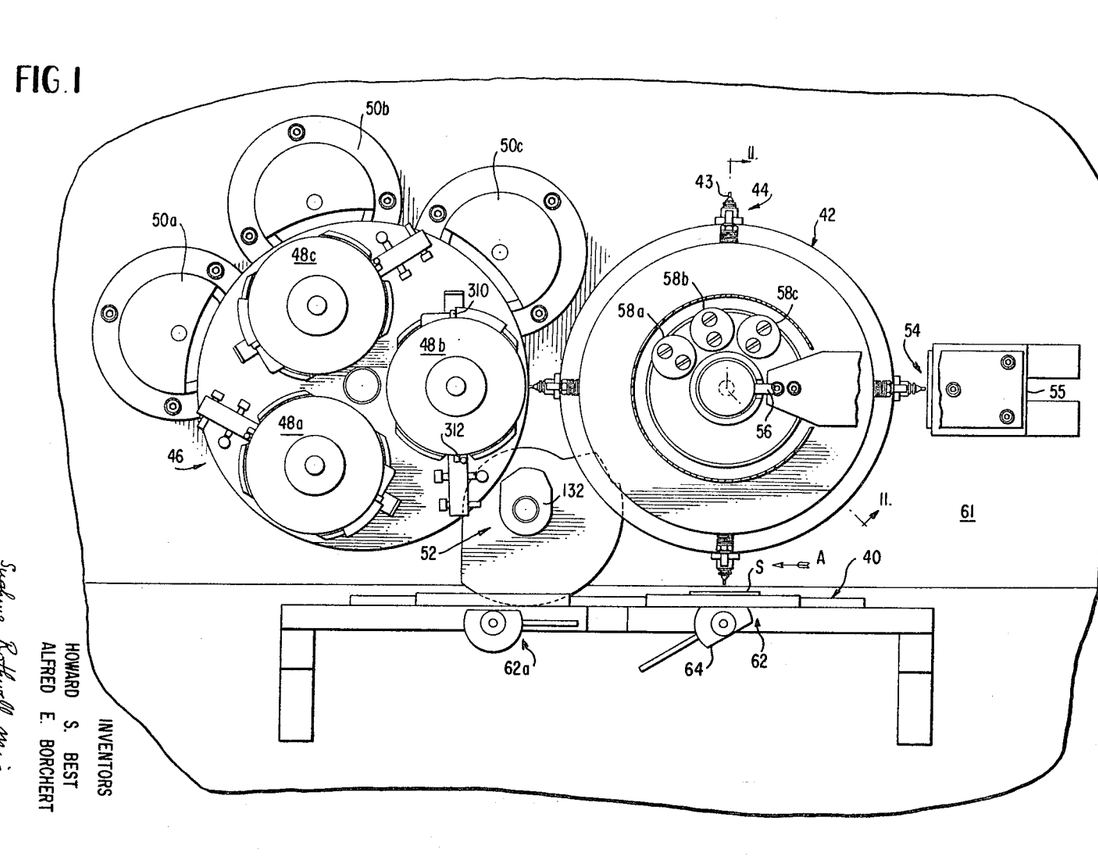
FIG. 1 is a front elevation of the machine of this invention showing the principal components thereof including the work support table, the rotatably indexable needle carrying head, the rotatably indexable turret and the alignment station with its missing chip detector.
Figure 9:
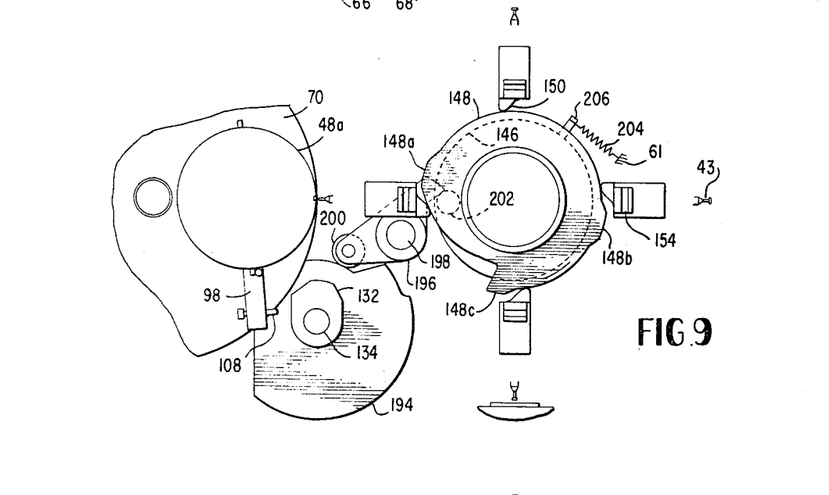
FIGS. 9 and 10 are semi-schematic views illustrating the arrangement for synchronizing the rotational drive of the chip turret and needle head.
Figure 10:
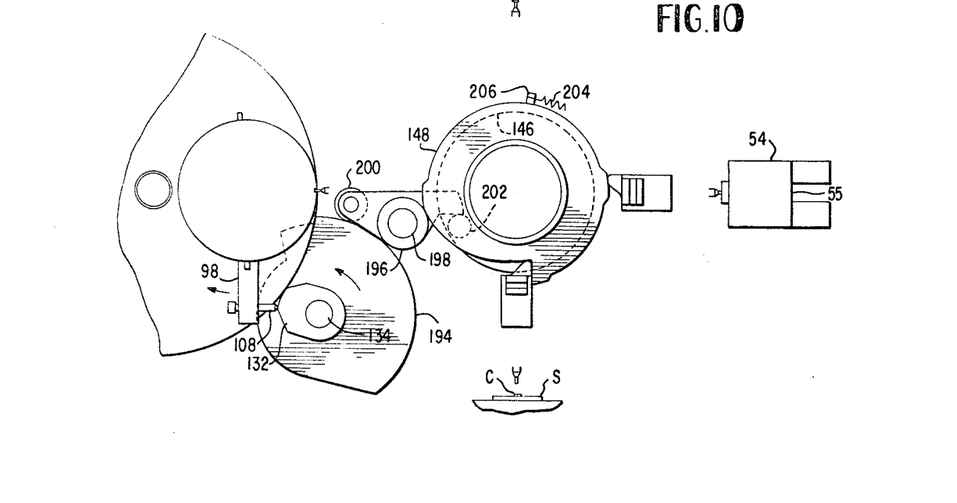

An interconnecting cam linkage assembly 52 shown in FIGS. 1, 9 and 10 is utilized to assist in intercontrolling the actuation of the reciprocable needles 43 and the indexing of the magazines 48.

At the three o'clock position of the needle head there is an alignment station 54 for mechanical alignment of a transistor chip C carried by the tip of each needle 43. The alignment station 54 includes a missing chip detector 55.

Vacuum may be applied to each of the hollow needles 43 in order to hold the transistor chips thereon. This vacuum is applied through vacuum connection 56, FIG. 1.

The needles 43 in addition to being reciprocable radially are also rotatable about their own axis for the purpose of orienting the electrodes of the chips prior to the chips being placed on the substrate. This orientation is accomplished by rotation of the needles 43 about their own axis under the control of orienting solenoids 58a, 58b, 58c.

Figure 8:
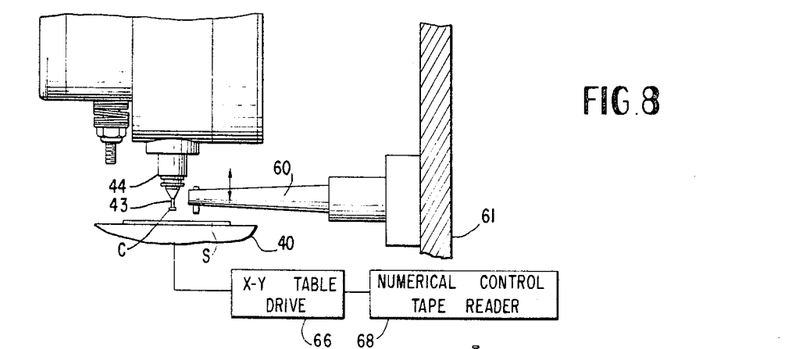
FIG. 8 is an end elevation view looking in the direction of the arrow A in FIG. 1 illustrating the sonic bonding head.

FIG. 8 shows a sonic bonding head 60 of a commercially available type which is movable up and down (by suitable mechanical means, not shown) relative to the substrate S on work table 40 to sonically bond each chip C after it is placed in position on the substrate by contacting the substrate and applying the bonding energy thereto and then to rise and clear the chips for further indexing movement of the work table 40.

The table 40 is driven in a horizontal plane under precise $x$, $y$ axis control by a suitable table drive 66 of conventional type under control of a numerical control tape reader 68. In this way the positioning of the substrate S relative to any deposited chip C can be preprogrammed. The numerical control tape reader also controls the selection of magazines 48a, 48b and 48c to determine which type of chip (assuming the magazines have different types of chips therein) will be placed on the substrate. The entire operation is further interlocked by the missing chip detector 55. The tape reader 68 also controls operation of the orientation solenoids 58a, 58b and 58c for the purpose of orienting each chip about its own axis for positioning of its electrodes relative to the substrate S.

Magazine turret

Figure 2:
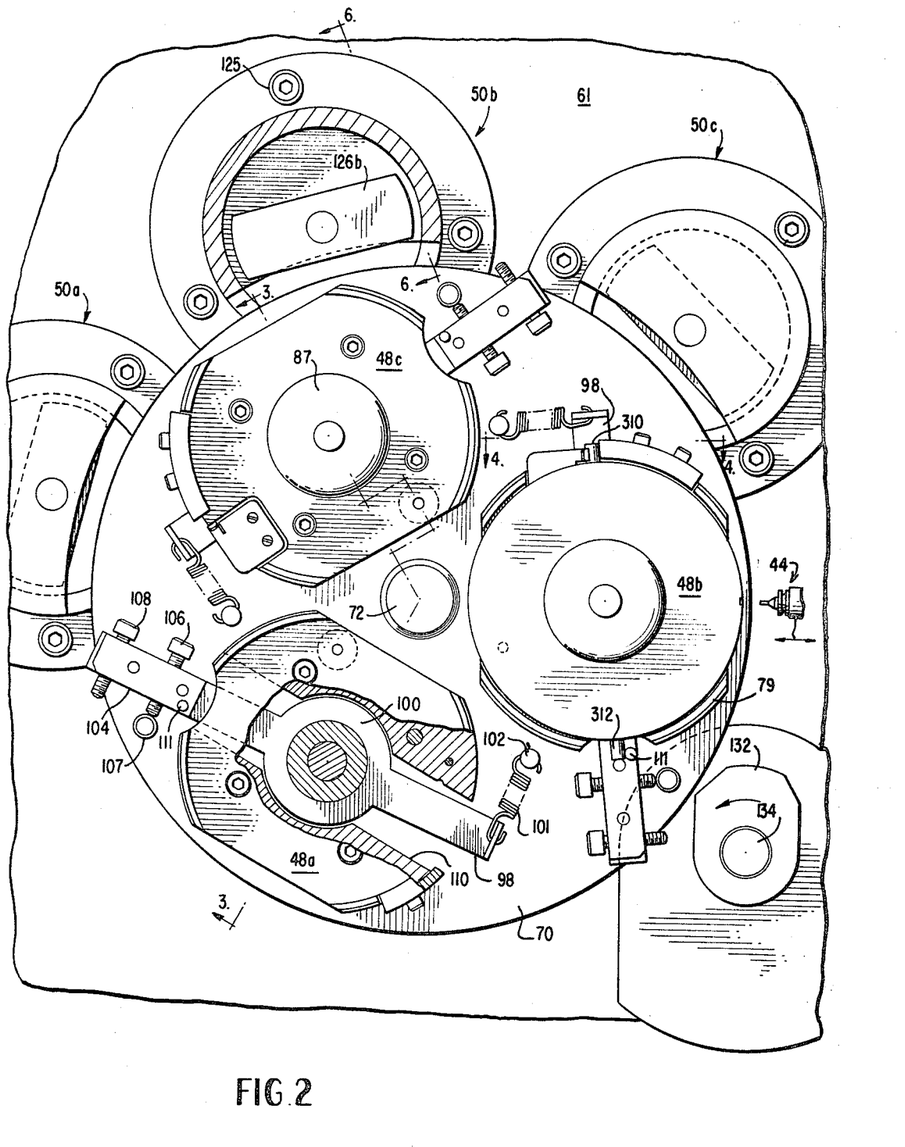
FIG. 2 is an enlarged detail front elevation of the magazine turret assembly shown partially in section to illustrate certain features of the invention.
Figure 3:
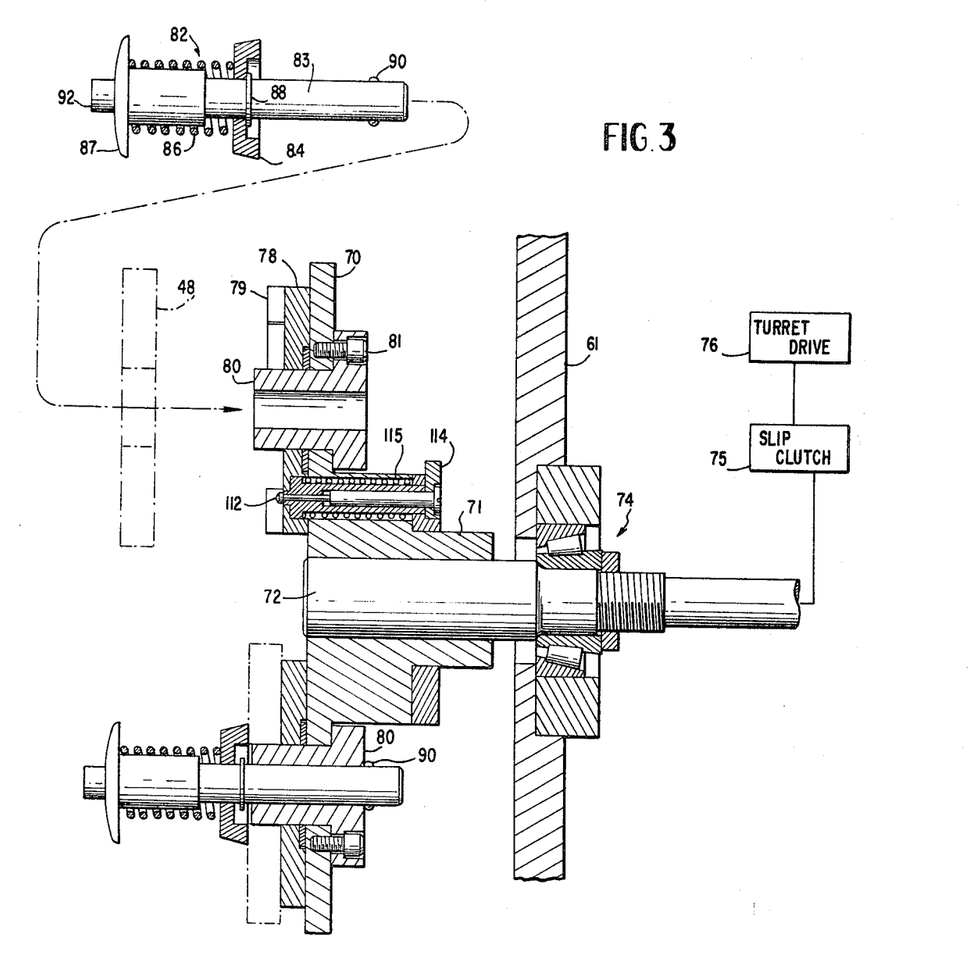
FIG. 3 is a sectional view taken along line 3—3 of FIG. 2.

The magazine turret 46 of FIG. 1 is shown in more detail in FIGS. 2–7. Referring to FIGS. 2 and 3, the turret 46 includes a turret plate 70 having a hub 71 mounted on a turret shaft 72 which is rotatably supported in bearing 74 from the machine support structure 61. Drive of the turret shaft 72 is from turret drive 76 through a slip clutch 75.

The magazines 48 are held in magazine pods 78 which have partial flanges 79 upstanding therefrom. Each magazine pod is mounted on a collar 80 which in turn it attached to turret plate 70 by screws 81.

FIG. 3 shows a magazine hold down assembly 82 which includes a shaft 83 carrying a washer 84. This washer is biased by a spring 86 acting against the washer 84 and a knob 87. Movement of the washer 84 in one direction is stoppped by rib 88 around shaft 83. Holding of the shaft 83 within the collar 80 is by means of detents 90 protruding from the shaft 83 and retractable by push pin 92. The magazines 48 may be placed in the pods 78 and the hold down assemblies 82 inserted. The hold down assemblies 82 can be easily removed by pressing on pin 92 retracting detents 90.

Figure 4:
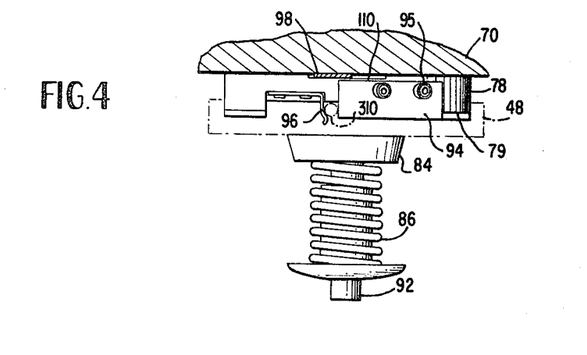
FIG. 4 is a sectional view taken along line 4—4 of FIG. 2.

As shown in FIG. 4 magazine pods 78 also include a stop 94 for a magazine pin. This stop is precisely located and held to the pod by screws 95 and the opposite side of the magazine pin is resiliently held by a spring lip 96.

As best shown in FIG. 2 each magazine is indexed by a pivotal indexing lever 98 having a circular portion 100 surrounding each collar 80. A spring 101 attached to one end of lever 98 and to spring post 102 biases each lever counterclockwise as viewed in FIG. 2. The other end of lever 98 includes a thickened end portion 104 for threadedly receiving stop adjustment screw 106 bearing against stop 107 extending from plate 70. A cam follower screw 108 is also threaded through end portion 104. As shown in FIGS. 2 and 4 there is a diametrical recess 110 in the bottom of each pod to allow the pivoting of the lever 98 relative to pod 78. Upstanding from lever 98 is an indexing post 111 for indexably driving an index pin on the magazine 48, when the lever 98 is pivoted.

The index turret is provided with three empty magazine sensing pins 112 one of which is shown in FIG. 3. These pins are connected to plates 114 and biased to the left as shown in FIG. 3 by spring 115 so that the head of pin 112 is urged to project above the surface of pod 78, and into the back of the magazine. On indexing of the magazine and as the magazine nears the empty condition, a rivet on a chip carrier within the magazine contact pin 112 to indicate that the magazine is almost empty by operating a switch in the control circuitry.

Figure 5:
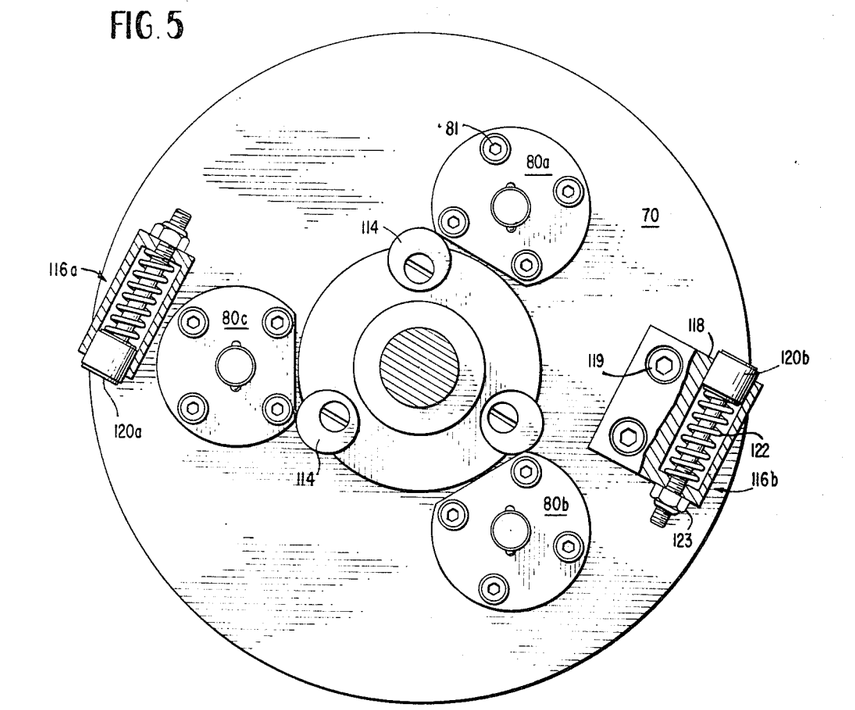
FIG. 5 is a rear elevation view of the indexable turret plate and its positioning stops.
Figure 6:
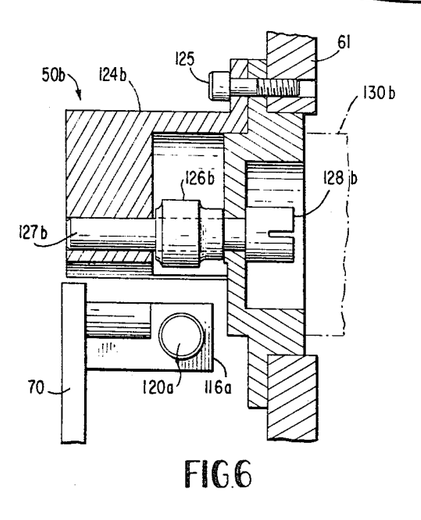
FIG. 6 is a sectional view of the turret stops taken along line 6—6 in FIG. 2.
Figure 7:
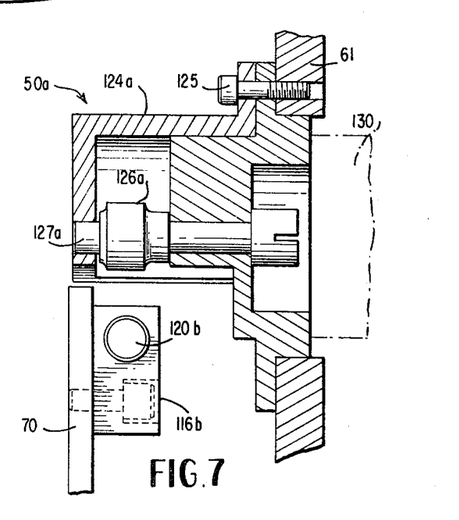
FIG. 7 is a sectional view similar to FIG. 6 showing the other shock absorbing turret stop adjacent a complementary stationary stop.

FIGS. 5–7 show the reverse side of the turret plate 70 and the stops for the turret. The turret plate 70 has a pair of shock absorbing stops 116a and 116b on the reverse side thereof. These stops are identical with the exception of the distance that they extend from the surface of the turret plate 70 and the distance they are from the machine support structure 61. The stops in general include a bracket 118 having a cylindrical bore, and they are secured to plate 70 by screws 119. The bore carries a piston 120 biased outwardly by spring 122 but adjustable by threaded nut 123. These shock absorbers cooperate with the stops 50a, 50b and 50c.

The details of stop 50b and shock absorber stop 116a are shown in FIG. 6. The stop 50b is comprised of a housing 124b secured to the machine frame 61 by screws 125 and a stop dog 126b is secured to shaft 127b which is rotatably journaled in housing 124b. The shaft 127b is provided with a drive collar 128b which is adapted to be engaged by the drive shaft of a rotary solenoid 130b. The piston 120a of shock absorber 116a is spaced from the turret plate 70 and reciprocates in the plane in which the stop dog 126b of stop 50b is adapted to rotate. Thus, when solenoid 130b is energized the dog 126b will be pivoted into the path of piston 120a to stop plate 70 with the magazine 48b at the needle pick-up station as shown in FIG. 2.

FIG. 7 is similar to FIG. 6 but shows the relationship of the stop dog 126a of stop 50a to the piston 120b of shock absorber 116b. It should be noted that the dog 126a and piston 120b operate in a plane parallel to and closer to the plate 70 than the plane in which the dog 126b and piston 120a operate. The relation of the stop 50c to the shock absorber 116b is identical to that shown in FIG. 7.

For internal indexing of the particular magazine on the magazine turret 46 which is at the three o'clock position of the turret as viewed in FIG. 1, there is provided an index cam 132 on a cam shaft 134. The indexing operation is accomplished by part of the intercontrolling cam linkage 52 of FIG. 1. The rotation of shaft 134 is operated in timed relation to the main indexing of turret 46.

Needle index head

The needle index head 42 carries four needle assemblies 44 and includes a rotatably indexable body 136 having a hub 138 cooperable with a drive shaft 139 emerging from a gear box 140 which in turn is driven through clutch 141, brake 142 and variable speed motor 143.

On the hub 138 is a bearing 144 for rotatably journaling a cam collar 146 secured to needle cam 148 by screw 149. Lubrication may be supplied through passage 145 in the collar.

The needle cam 148 cooperates with a needle cam follower 150 which is biased thereagainst by spring 152 abutting against closing ring 153. See FIGS. 11 and 15. The cam follower 150 includes a pinion engaging notch 154 for engaging pinion 156 of the needle assembly 44 in order to reciprocate the needle assembly radially with regard to the index head.

Vacuum from vacuum connector 56 is applied to the needles through a vacuum spider shaft 158 secured to body 136 for rotation therewith and through a rotary seal housing 160. The spider shaft includes radial vacuum passages 162 which connect to further radial passages 164 in body 136. See FIGS. 11 and 15. Passage 164 is in communication with a plugged transverse passage 166, FIG. 15, which in turn is connected to the needle assembly 44 through needle bearing 168 having opening 169 therein. See FIGS. 15 and 12.

Figures 11, 12, 13, 14:
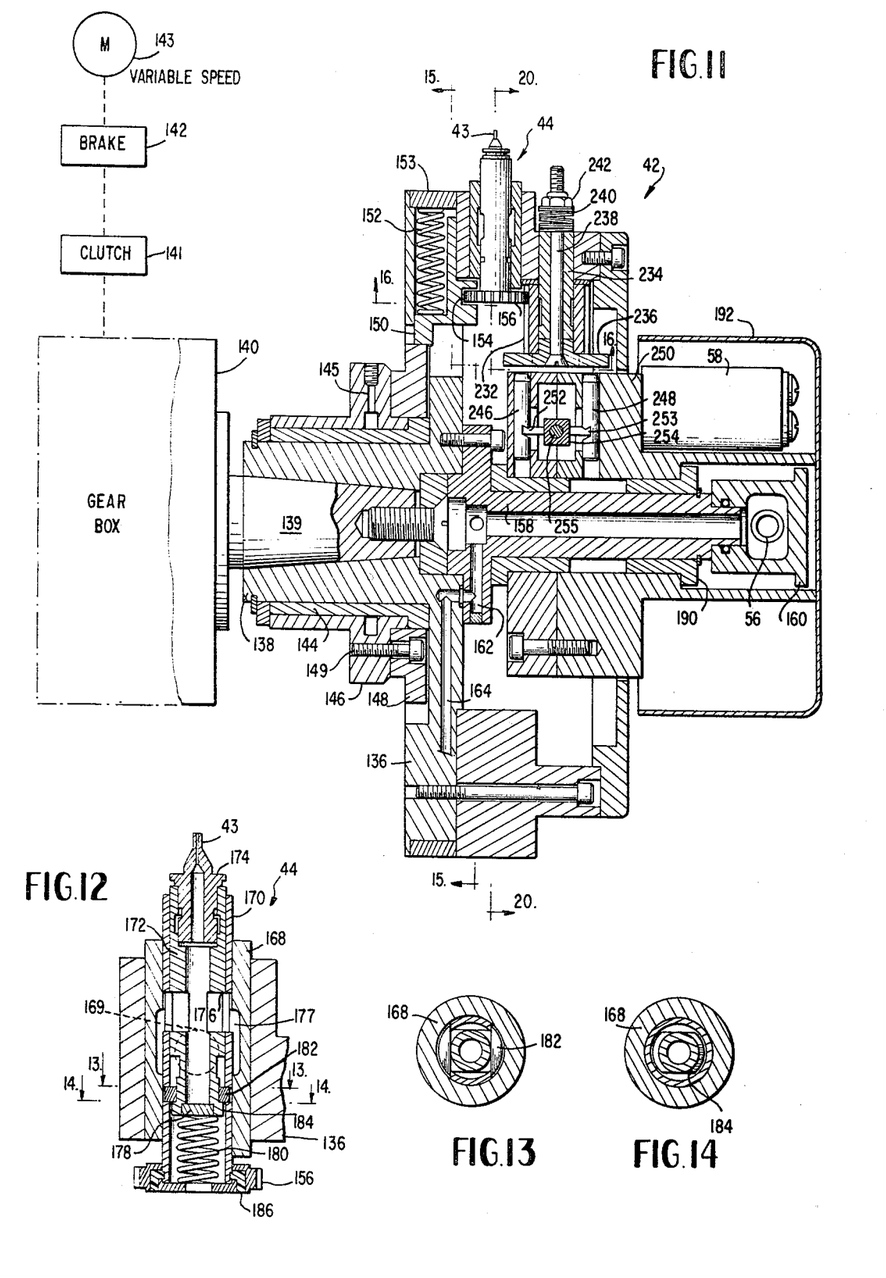
FIG. 11 is an enlarged sectional view taken along line 11—11 of FIG. 1.
FIG. 12 is a sectional view through a needle and needle holder.
FIG. 13 is a sectional view taken along line 13—13 of FIG. 12.
FIG. 14 is a sectional view taken along line 14—14 of FIG. 12.

As shown in FIG. 12 each needle assembly 44 includes within the bearing 168 a needle tube 170 having a needle holder 172 therein which in turn mounts a hollow needle tip 174. There is a transverse passage 176 through the needle tube 170 and needle holder 172 which opens into recess 177 adjacent the vacuum passage 169 so that vacuum is always applied to the hollow needle 43 in any reciprocable position of the needle. The bottom of the needle holder 172 is plugged by plug 178 and the holder is biased outwardly within tube 170 by means of spring 180. The needle tip 174 and its holder 172 may be removed from the outside of the index head by the arrangement including a stop ring 182 having a pair of moon shaped stops 180° apart and corresponding moon shaped cuts in flange 184 of the needle holder 172, FIGS. 13 and 14. By pushing needle holder 172 radially inwardly and rotating it until the cut flange 184 registers with the stop 182, the needle may then be removed radially outwardly. However, by rotating the needle holder so that the non-cut portion of flange 184 catches under stop 182, spring 180 will hold the needle in position. The rotatable drive connection of the needle is through pinion 156 connected to needle tube 170 primarily by resilient cushioning material 186.

Needle axis rotation control

The pinion 156 is utilized to rotate the needle assembly 44 about its axis, this rotation being necessary and desirable to rotate a transistor chip C to orient the electrodes thereof relative to the position that it will be placed on the substrate circuit. Rotation of the needle assembly 44 is accomplished by pinion 156 engaging elongated needle indexing gear 232. See FIG. 11. Needle indexing gear 232 in turn is positioned around shaft 234 which carries a mutilated wheel 236 on its lower end. This wheel functions as a portion of a Geneva indexing mechanism for indexing shaft 234 and gear 232 through a predetermined angle in order to rotate the needle assembly 44 in two steps, the first being plus or minus 90° and the second step being plus 90°. In this manner, a transistor chip C carried by the needle 43 may be picked up at the nine o'clock position of the head and rotated either plus or minus 90° as required during the next 45° rotation of the head, and if a 180° rotation is required for orientation, the chip is rotated another plus 90° during the next 45° of rotation of the turret.

A shock absorber or brake arrangement is provided by a central screw 238 which goes through shaft 234 and resilient washers 240 which are forced downwardly by nut 242 in order to provide a desired frictional connection between the gear 232 and the shaft 234.

Figures 15, 16, 17, 18, 19:
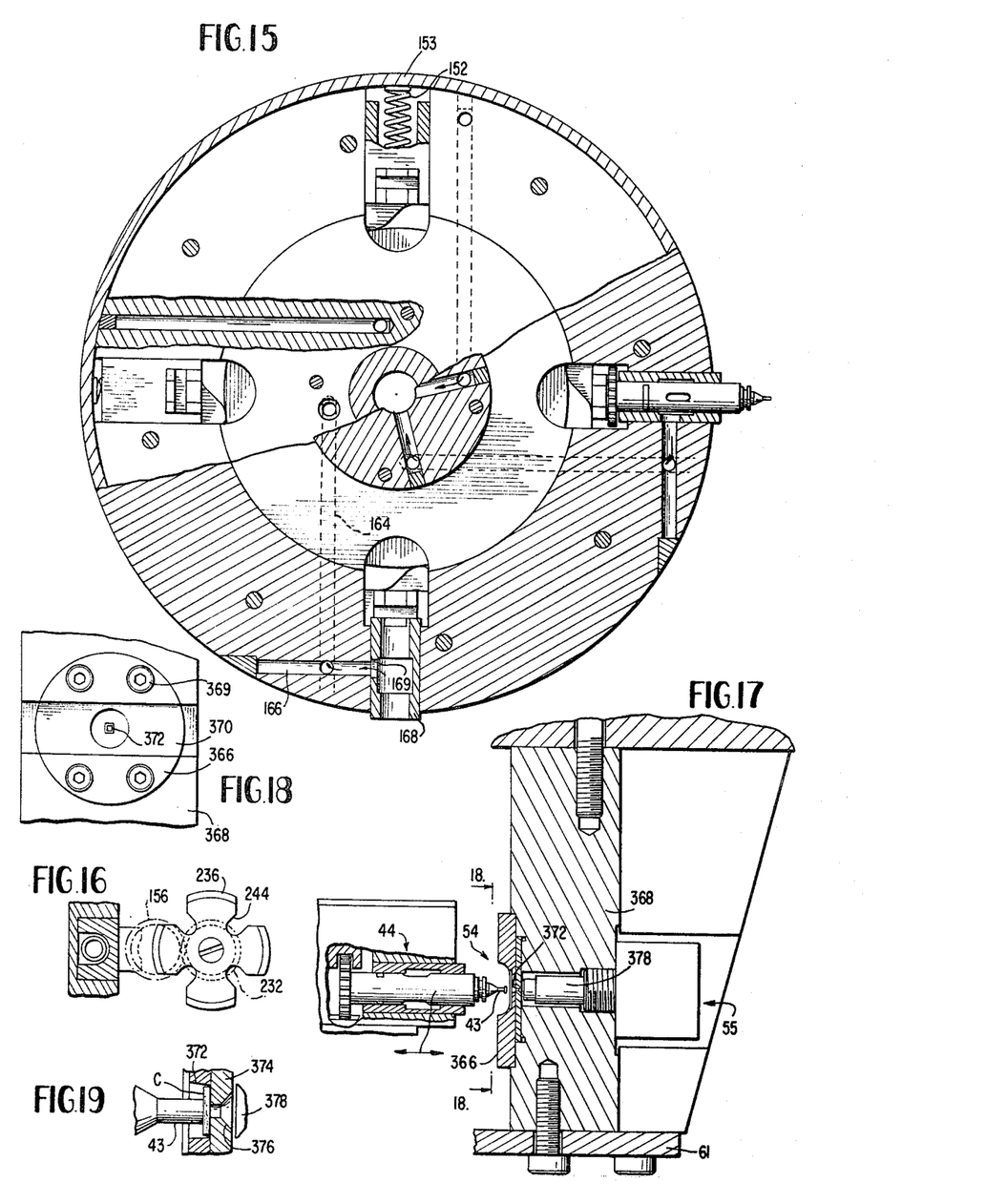
FIG. 15 is a sectional view taken along line 15—15 of FIG. 11.
FIG. 16 is a sectional view taken along line 16—16 of FIG. 11.
FIG. 17 is a sectional view through the alignment fixture at the alignment station.
FIG. 18 is an elevation view of the face of the alignment fixture looking in the direction of line 18—18 of FIG. 17.
FIG. 19 is an enlarged detail of the alignment fixture and missing chip detector shown in FIG. 17.
Figure 20:
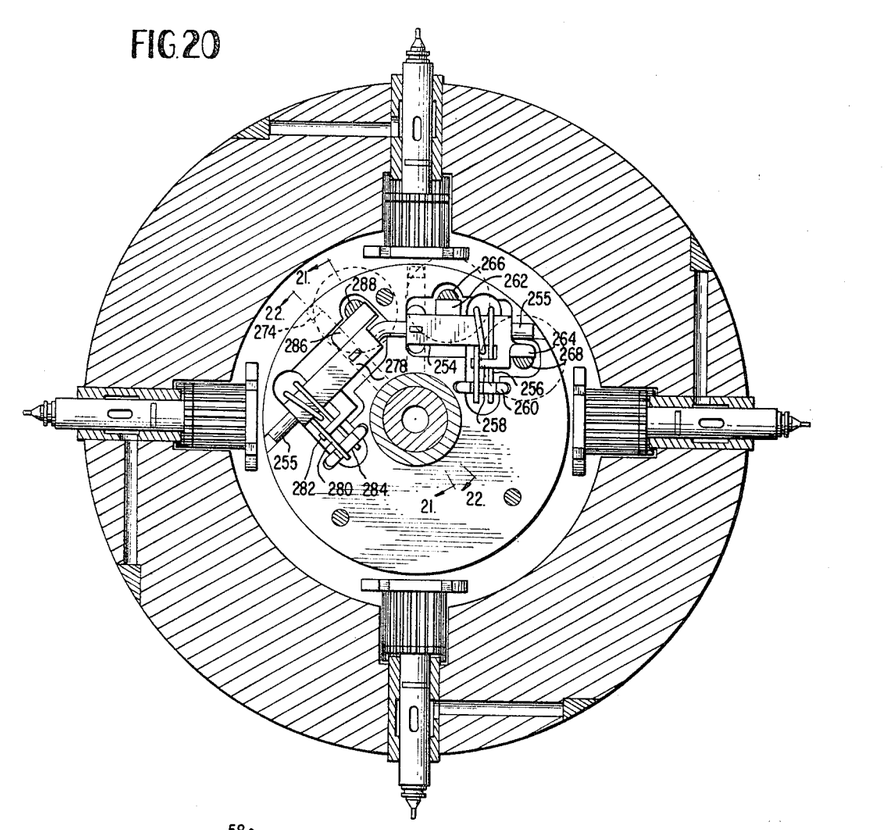
FIG. 20 is a sectional view taken along line 20—20 of FIG. 11.
Figure 21:
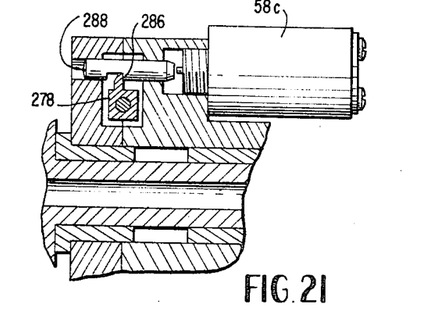
FIG. 21 is a sectional view taken along line 21—21 of FIG. 20.

Referring to FIG. 16, slots 244 in the mutilated gear 236 are provided to be engaged with pins which are projected upwardly from a solenoid carrying pin block 250. Block 250 is stationary during rotation of the head and hence is stationary during rotation of the entire assembly including mutilated gear 236 about a horizontal axis. When a pin is selectively projected radially outwardly to engage one of the slots 244 in a mutilated gear 236, the pin being stationary will hold the gear relatively stationary while the entire movement about the horizontal axis of the turret will cause rotation of the mutilated wheel 236 and of the gear 232 to thereby rotate the needle assembly 44.

There are three pins which are selectively projected from block 250 in order to cause the indexing movement. Pins 246 and 248 are alternately operated depending upon whether plus or minus 90° orientation is desired in the first 45° of travel of the head from the nine o'clock position. If a further 90° of orientation is desired to provide 180° rotation of the chip carried by the needle, a further pin 274 is projected from the block 150 after 45° of rotation from the nine o'clock position.

The mechanism for projecting pins 248, 246, 274 and the pins themselves are illustrated in FIGS. 11, 20, 21 and 22. The pins 246 and 248 are engaged by arms 252 and 253, respectively, which arms extend from member 254 rotatably supported on shaft 255. A spring 256, FIG. 20, wound around member 254 is provided to normally hold the pins in the retracted position as shown in FIG. 11. The spring contacts tang 258 extending from member 254 and is referenced on lug 260 within the block 250. Also extending from the surface of member 254 and tangs 262 and 264 which in turn are contacted by operating rods 266 and 268, respectively.

Figure 22:
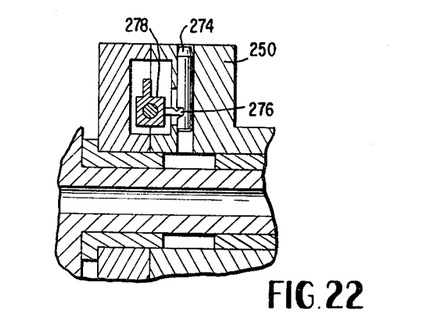
FIG. 22 is a sectional view taken along line 22—22 of FIG. 20.
Figure 23:
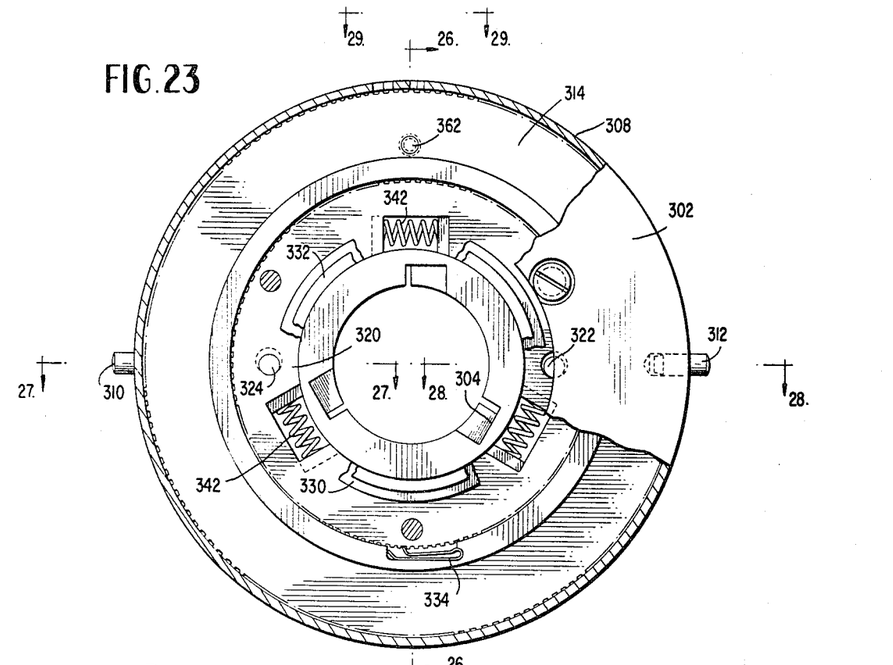
FIG. 23 is a front elevation view of the magazine of this invention with the cover removed and portions shown in section for the sake of clarity.
Figure 24:
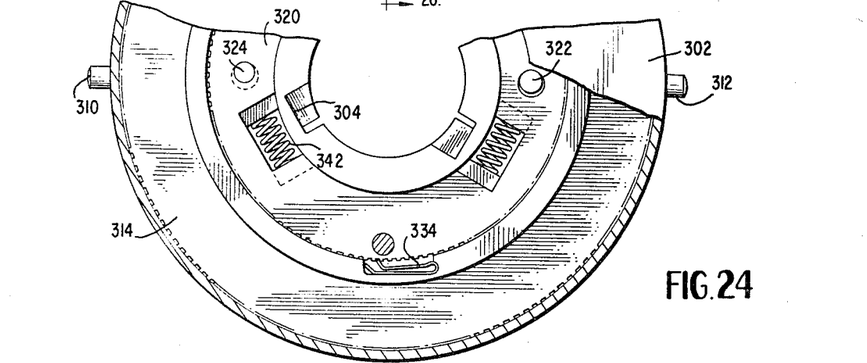
FIG. 24 is a partial view of the magazine of FIG. 23 during indexing movement.
Figure 25:
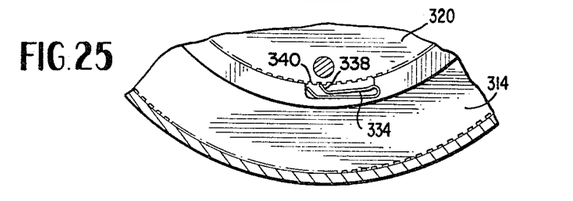
FIG. 25 is a partial view of the magazine of FIG. 23 shown during a further portion of the indexing movement.

In a similar manner, pin 274, shown in FIG. 22, may be projected from block 250 by arm 276 attached to member 278 which in turn is also rotatable on shaft 255. In a manner similar to that discussed above, spring 280 normally biases the pin 274 to retracted position by contacting tang 282 on member 278 and being secured in lug 284. A tang 286 projecting from member 278 is contacted by solenoid 58c operating rod 288 in the manner shown in FIG. 21.

Needle reciprocation and intercontrol with magazine indexing

Referring to FIGS. 9 and 10 taken in connection with FIG. 11 and FIG. 1, there is shown the arrangement for intercontrolling the radial reciprocation of the needles to deposit a chip on the substrate and to simultaneously (but with another needle) pick up a chip from magazine 48a. Cam 132 on cam shaft 134 contacts screw 108 on index lever 98 to index magazine 48a one chip position. At the same time cam 148 is utilized to extend the needles at the three o'clock, nine o'clock and six o'clock positions of the needle head. As can be seen, cam 148 has protrusions 148a, 148b and 148c for cooperating with the cam follower 150 of each of the needles. The needle cam 148 is driven in an oscillating manner under the control of drive cam 194 on cam shaft 134. A rocker arm 196 pivoted on shaft 198 has a cam follower roller 200 on one end contacting cam 194 and the other end of arm 196 contacts a projecting lug 202 which is rigid with cam 148 by being secured to the back of ring 146. See FIG. 11. The ring 146 and cam 148 are normally biased to the FIG. 9 position by spring 204 connected between pin 206 and the machine frame 61. The position of FIG. 9 is with the needles 43 retracted inwardly under the bias of spring 152 in the needle head, FIG. 11. However, on rotation of cam shaft 134 cam 132 will cause indexing of the magazine 48a under control of lever 98 and the cam 194 will rock arm 196 about its pivot 198 driving the needle cam 148 counterclockwise against the bias of spring 204 to project the needles radially outwardly at the nine o'clock and three o'clock positions and also at the six o'clock position. The projection of the needle at the nine o'clock position picks up a chip (by vacuum applied to the needle) while the projection of the needle at three o'clock moves its tip and chip carried thereby into the alignment fixture 54 and missing chip detector 55. The cam 148c causes the needle in the six o'clock position to deposit the chip C on the substrate S and to retract rapidly. The substrate is coated with a sticky substance so that quick retraction of the needle carrying the chip even with vacuum constantly applied will allow the chip to stick to the substrate in order to be subsequently bonded by the sonic bonding head 60, FIG. 8. After the needles are in the position of FIG. 10 the spring 204 gradually returns the cam 148 to the position of FIG. 9, thus readying the head for another operation. In the meantime, however, the needles themselves are traveling clockwise as viewed in FIGS. 9 and 10 and before the needles are reciprocated again each needle has moved 90° about the axis of needle head 42.

*The magazine*

The circular magazine 48 is best shown in FIGS. 23 through 29, inclusive. The magazine includes a back member 300 and a cover member 302. The back member has a hub 304 with helical splined slots 306 therein. The cover member 302 has a flange 308. A pin 310 is secured to the back member and is utilized to hold the magazine 48 in reference position while a pin 312 is secured to the cover member 302 and is utilized for indexing purposes. Within a cavity formed by the inside surfaces of the back 300 and cover 302, there is a toothed chip carrier 314 capable of carrying chip C in a space 316 between its teeth and the inside surface of flange 308. Spaced radially inwardly from the annular tooth chip carrier 314 are a pair of transversely split gears 318 and 320. Split gear 318 includes a pin 322 and similarly, split gear 320 includes a pin 324. These pins extend into larger sized openings 326 and 328, respectively, and the gear adjacent the one which holds the pin. A spring 330 held on ring 332 biases the split gears 318 and 320 in frictional engagement.

A spring pawl 334 in a cavity 336 in chip carrier 314 has a finger 338 cooperating with ratchet teeth 340 on the periphery of both split gears 318 and 320. A number of springs 342 are in recesses 344 spaced about the periphery of the gears 318, 320, for biasing the gears to a normal position, FIG. 23.

A screw 346 is threaded through cover 302 into split gear 320 to secure the gear to the cover and a screw 348 is threaded through the back 300 into gear 318 to secure this gear to the back. Hence, when the cover 302 is moved relative to the back 300 by means of moving pin 312 while holding pin 310, gear 320 will move a short distance relative to gear 318. Since teeth 340 on the periphery of the gears are engaged by pawl finger 338, and since pawl 344 is positioned to allow the gear teeth 340 to slip by it, no movement will be imparted to the chip carrier 314. See FIGS. 23 and 24.

As the indexing drive force on pin 312 is removed, springs 342 attempt to bring the split gears 318 and 320 back to the original position (from the FIG. 24 position back to the FIG. 23 position) which in turn causes the cover 302 connected to gear 320 to return to its original position. The teeth 340 on gear 320 will be drivingly engaged by pawl 334 carried in chip carrier 314, so that return movement of gear 320 will cause indexing of the chip carrier 314 an angular distance equal to one tooth space.

Figures 26, 27, 28, 29:
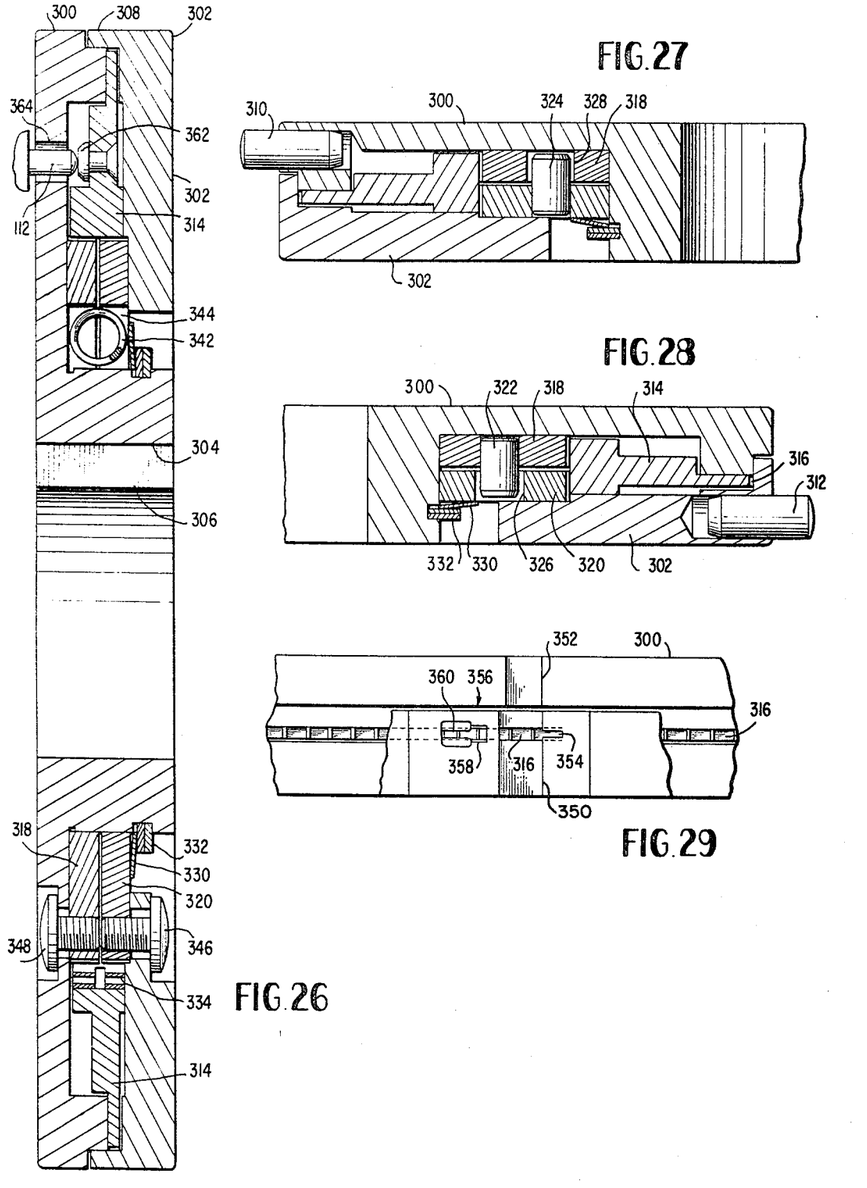
FIG. 26 is an enlarged sectional view taken along line 26—26 of FIG. 23.
FIG. 27 is an enlarged sectional view taken along line 27—27 of FIG. 23.
FIG. 28 is an enlarged sectional view taken along line 28—28 of FIG. 23.
FIG. 29 is an enlarged view looking in the direction of line 29—29 in FIG. 23.

The indexing movement of the chip carrier 314 and the return movement of the cover 302 only is utilized to allow removal of the chips one at a time utilizing the slot arrangement shown in FIG. 29.

In this arrangement, both the cover 302 and back 300 have transverse slots 350 and 352, respectively. In addition, the cover flange 302 has a removal slot 354 overlying the teeth spaces 316 of the chip carrier 314. The width of the removal slot 354 is wider than the tip of the needle 43 but narrower than the width of the transistor chip capturing space 316 and also narrower than the square chip C. Hence, for chip removal operations needle 43 is inserted into slot 354 while vacuum is applied to the needle. The magazine is indexed one space equal to the width of space 316 and the slot 316 appears as shown in FIG. 29 with the chip exposed for removal. However, as long as it is under the slot 354, it is not removed.

For placing tested and oriented transistor chips in the magazine (by the machine disclosed in copending application, Ser. No. 576,483, filed Aug. 31, 1966), there is a keyhole-shaped slot 356 in the cover on the other side of groove 350 and this slot includes a large sized openings 358 and a narrow stripper ledge 360. The width of the space in stripper ledge 360 is slightly greater than the width of needle tip 37. The length and width of slot portion 358 is larger than the size of the transistor chip C. In this manner, a needle with a transistor chip held by vacuum can move into position to place the transistor chip in a space 316 which lies below the slot 358 and the cover 302 is then indexed to move the cover so that stripper ledge 360 is over the space 316 carrying the chip. At this time, the needle is retracted and the undersides of the stripper ledge 360 hold a transistor chip down so that it may be retained in space 316 of the chip carrier 314 as the cover 302 returns to its normal position. Thus, the magazine is the same as disclosed in the aforesaid copending application and can be used interchangeably with the machine of said prior application or the machine of this application.

Chip carrier 314 carries a rivet 362 in a position thereon to indicate when the magazine is nearly empty of chips. Back 300 has an opening 364 thereon for accommodating empty magazine sensing pin 112. See FIGS. 3 and 26.

*Chip alignment station and missing chip detector*

The chip alignment station 54 and missing chip detector 55 of FIG. 1 are shown in more detail in FIGS. 17, 18 and 19. The alignment fixture includes an alignment face plate 366 secured to housing 368 by screws 369 and this housing in turn is secured to the machine support 61. The alignment face plate 366 has a groove 370 across its face to accommodate movement of needle 43 during rotary movement of the needle head and in the center of the groove 370 there is a tapered square hole for the purpose of mechanically aligning a chip C carried on the tip of needle 43. As can be seen in FIG. 19, when the needle 43 reciprocates axially and moves the chip C into the alignment fixture, the square chip will be aligned by the tapered edges of the square alignment hole 372. Thus the chip will be precisely aligned with respect to the center line of the needle 43 for its precise placement on the substrate at the six o'clock position of the needle head. See FIG. 1.

For detecting whether or not a chip C is on the tip of needle 43 the missing chip detector 55 includes a backing plate 374 behind the alignment face plate 366 and this backing plate has an opening 376 therein. A vacuum sensing switch 378 is adjacent the opening 376. Thus, with this arrangement, when vacuum is applied to the hollow needle 43 and no chip is on the tip of needle 43, vacuum will be applied to vacuum sensing switch 378. This vacuum sensing switch is in effect a missing chip detection switch which is utilized to operate suitable controls of the machine.

*Electrical control and machine operation*

Figure 30:
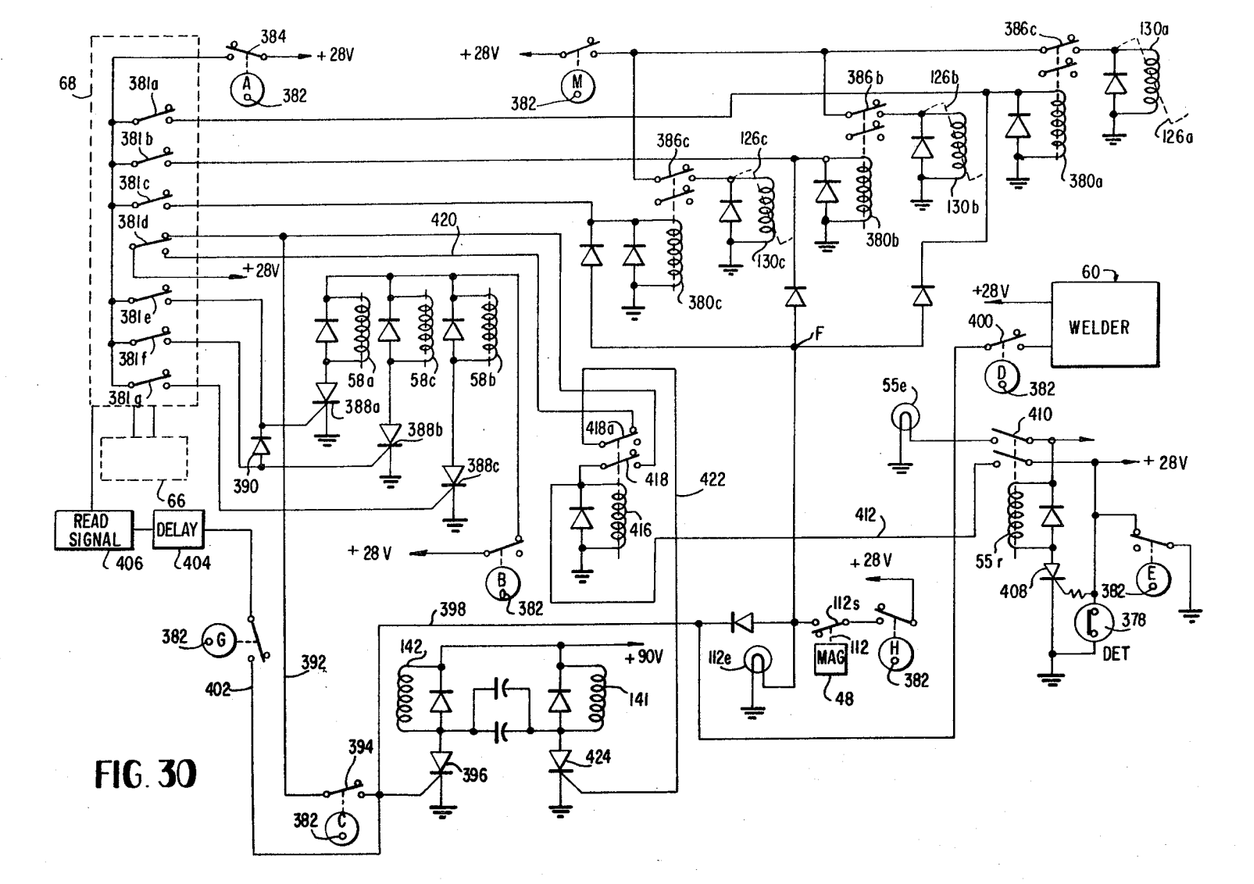
FIG. 30 is an electrical circuit diagram illustrating the control of the machine.

The electrical circuit diagram of FIG. 30 includes certain of the same reference numerals as have been used for the components heretofore described, for example, the circuit diagram shows the numerical control 68, the solenoids 130 for the turret stops 50, the empty magazine detection pin 112, the needle head clutch 141 and brake 142, the missing chip detector switch 378 for operating missing chip detector 55 and the orienting solenoids 58a, 58b and 58c for causing rotation of the needles about their own axis for orienting the electrodes of the chip carried by the needles.

In operation the numerical control 68, in addition to controlling the movements of table 66, effectively operates one of the switches 381a, 381b and 381c for the magazine selection. It also controls operation of switch 381d for controlling the welding signal and the sequential indexing of the needle head as well as the selection operation of switches 381e, 381f and 381g to control the orienting solenoids 58a, 58b and 58c. The numerical control may be of a commercially available type and the machine of this invention includes a cam shaft 382 having a number of cams thereon, such as the cam A that controls switch 384 applying the power to the numerical control and timing the operation of the machine. The rotation of shaft 382 is in timed relation to the rotation of cam shaft 132.

The numerical control will supply a signal which in effect will close one of the switches 381a, 381b or 381c to energize a selective one of the solenoids 380a, 380b or 380c. Energization of these solenoids pulls in a selective one of the relays 386a, 386b or 386c applying power to energize the corresponding solenoid 130a, 130b or 130c in cooperation with the switch controlled by cam M to rotate corresponding stops 126a, 126b or 126c to place the selected stop in position to stop the magazine turret by cooperating with selected ones of the stops 116a or 116b of magazine turret 46. This will stop one of the magazines 48a, 48b or 48c at the three o'clock position of the turret 46 and nine o'clock position of the needle head 42 with the removal slot of the magazine in position for needle 43 to be extended outwardly under the control of cam 148 so that the vacuum continuously applied to the needle 43 will pick up a chip as the magazine is indexed under the control of cam 132 and indexing lever 98 operating on magaizne pin 312.

At the same time that the needle in the nine o'clock position of the needle head 42 is accomplishing this operation the other three needles are at the twelve o'clock, three o'clock and six o'clock positions. Only the operation of one needle through the rotation of the needle head 42 will be described although all the other needles are accomplishing corresponding operations according to the position they are in.

After the chip is on the tip of the needle the needle is again retracted by the interlocking cam arrangement to the position of FIG. 9 and the needle head 42 is rotated 90°. During this rotation the numerical control 86 may selectively close one of the switches 381e or 381g for either a plus or a minus 90° rotation of the needle about its own axis through gear 232 and after may or may not selectively close switch 381f to provide a second 90° of rotation by energizing solenoid 58c. These solenoids are energized under the control of SCR's 388a, 388b and 388c. When the plus 180° switch 381f is closed both SCR's 388a and 388b will be fired energizing both solenoids 58a and 58c. However, blocking diode 390 will prevent the firing of SCR 388b when switch 381e is closed thus only firing SCR 388a to energize solenoid 58a for the plus 90° rotation. The cam B is timed to open the circuits to solenoids 388a, 388b and 388c after a predetermined time to return thereto their normal state ready for the next orienting operation.

When bonding control switch 381d is in the position shown in FIG. 30 power is applied to line 392 through control switch 394 which is under the control of cam C to fire SCR 396 energizing brake solenoid 142 and braking or stopping the needle head 42. At the same time a signal goes over line 398 through cam switch 400 closed at the appropriate time in the cycle by cam D to operate the welder 60 which at that time is in welding position over the chip C which has been placed on the substrate and the work table 40 has moved the chip under the tip of the welding head 60.

At the same time the welding is taking place, a signal has gone over line 402 through a delay 404 and timing cam G which after an appropriate delay energizes a read unit 406 to tell the numerical control unit 68 to read the next step of instructions.

If a chip is missing, missing chip detector switch 378 will close the circuit in cooperation with cam E to fire SCR 408 which in turn will energize missing chip relay 55r to transfer the contacts 410 of this relay applying power through line 412 to energize an automatic start inhibit relay 416 which by transfer of its contacts 418 will inhibit the automatic starting of the needle head for the next operation. Also contact 410 energizes a signal lamp 55e. When the bonding control switch 381d under the control of numerical control 68 is moved from the position shown in FIG. 30 to the other position, power is applied over line 420 through the upper set of contacts 418a through conductor 422 to fire SCR 424 and energize clutch 141, at the same time brake 142 is deenergized thus driving the needle head 42 through the next 90°.

If there is a magazine 48 which is almost empty sensing pin 112 will operate switch 112s which will close to apply power to illuminate empty magazine signal light 112e when timing cam H closes its switch and applies the power over line 398 to energize brake 142, stopping the head 42. The signal to energize brake coil 142 is also applied to line 402 but is blocked since the switch controlled by cam G is open. Closure of magazine detector switch 112s and the switch operated by timing cam H also applies a signal to junction point F to back bias and throw out circuitry for magazine selection.

It can thus be seen that the four needles will operate in accordance with their respective stations and will first pick up a chip from a selected one of the magazines 48a, 48b and 48c which have been placed in the position under the control of stops 50a, 50b and 50c. During the rotation of the needle head 42 through the next 180° clockwise, as viewed in FIG. 1, solenoids 58a, 58b and 58c under the control of the numerical control will rotate the needle about its axis as desired to orient the chip. At the three o'clock position the needle is extended again for mechanical alignment of the chip by tapered hole 372 and, if a chip is missing, a missing chip detector will stop the machine. The head is then rotated through the next 90° and the needle will extend outwardly to place the chip on the substrate which has been precisely positioned also under the control of the numerical control through the table drive 66, FIG. 8. The cam configuration 148c rapidly retracts the needle at the six o'clock position and sticky substance on the substrate will hold the chip even though vacuum is continuously applied to the needle. The substrate then moves to place the just deposited chip under the tip of the sonic bonding head 60 and it is bonded to the substrate with the pillars of the chip down in contact with the substrate in a precise position with tolerances in the order of .001 inch.

While the invention has been particularly shown and described with reference to a preferred embodiment thereof, it will be understood by those in the art that various changes in form and details may be made therein without departing from the spirit and scope of the invention.

What is claimed is:

1. In a machine for automatically selecting and placing semiconductor chips or the like on a substrate, the machine of the type including, a table for supporting the substrate, a needle carrier adjacent said table, a needle carried by said carrier, the improvements comprising; the needle carrier being a rotatably indexable head carrying a plurality of said needles radially reciprocable therein, a rotatably indexable magazine turret adjacent said indexable head, a plurality of chip magazines carried by said magazine turret, and intercontrol means for intercontrolling indexing of the head, reciprocation of the needles, and indexing of the turret to allow selection of a chip from a predetermined magazine on the turret and placing of the selected chip at a predetermined position on the substrate.

2. A machine as defined in claim 1 wherein said table is movably mounted for precisely positioning a substrate relative to said indexable head.

3. A machine as defined in claim 2 wherein said table is controllably driven on two axes in a horizontal plane by a preprogrammed numerically controlled drive means.

4. A machine as defined in claim 1 wherein said needles are hollow and means are provided for applying vacuum to the tips of said needles.

5. A machine as defined in claim 4 wherein the vacuum applying means includes a vacuum source and passages in said indexable head leading to the vacuum tip.

6. A machine as defined in claim 1 further including selectively operable stops adjacent said indexable turret to stop said turret with a predetermined magazine adjacent said indexable head.

7. A machine as defined in claim 6 wherein said magazines are rotatably indexable magazines carrying chips peripherally therein and include means for signaling when said magazines are empty.

8. A machine as defined in claim 1 further comprising means for bonding a semiconductor chip placed on the substrate to the substrate.

9. A machine as defined in claim 8 wherein the bonding means includes a sonic bonding head movable relative to the substrate.

10. A machine as defined in claim 1 further comprising a chip alignment fixture adjacent the periphery of said indexable head for cooperation with a chip carried by one of said reciprocable needles prior to the chip being placed on the substrate.

11. A machine as defined in claim 10 wherein said chip alignment fixture includes a missing chip detecting means.

12. A machine as defined in claim 11 wherein said missing chip detecting means includes a vacuum sensitive switch.

13. A machine as defined in claim 1 further comprising means within said indexable head for rotating the needles about their own axis for orientation purposes.

14. A machine as defined in claim 13 wherein said needle rotation means is electrically controlled from a preselecting orientation control means.

15. A machine as defined in claim 14 wherein said needle rotation means further includes solenoid projectable pins cooperating with a multilated gear in mesh with a pinion carrying said needles, and means for mounting said needles for rotation as well as reciprocation.

References Cited
UNITED STATES PATENTS

| | | | |
|---|---|---|---|
| 3,357,621 | 12/1967 | Badini | 228—47 |
| 3,029,666 | 4/1962 | Lovins | 229—1 |

RICHARD H. EANES, JR., *Primary Examiner.*